(12) United States Patent
Yamada

(10) Patent No.: US 12,344,232 B2
(45) Date of Patent: Jul. 1, 2025

(54) HYBRID ELECTRIC VEHICLE

(71) Applicant: TOYOTA JIDOSHA KABUSHIKI KAISHA, Toyota (JP)

(72) Inventor: Yuki Yamada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 305 days.

(21) Appl. No.: 18/122,976

(22) Filed: Mar. 17, 2023

(65) Prior Publication Data

US 2023/0373465 A1 Nov. 23, 2023

(30) Foreign Application Priority Data

May 17, 2022 (JP) .................................. 2022-081134

(51) Int. Cl.
*B60W 20/00* (2016.01)
*B60K 6/442* (2007.10)
*B60W 10/06* (2006.01)
*B60W 10/08* (2006.01)
*B60W 20/12* (2016.01)
*B60W 20/13* (2016.01)
*B60W 20/20* (2016.01)

(52) U.S. Cl.
CPC .............. *B60W 20/20* (2013.01); *B60K 6/442* (2013.01); *B60W 10/06* (2013.01); *B60W 10/08* (2013.01); *B60W 20/12* (2016.01); *B60W 20/13* (2016.01); *B60W 2510/244* (2013.01); *B60W 2710/06* (2013.01); *B60W 2710/08* (2013.01); *B60Y 2200/92* (2013.01)

(58) Field of Classification Search
None
See application file for complete search history.

(56) References Cited

U.S. PATENT DOCUMENTS

| | | |
|---|---|---|
| 2015/0307083 A1 | 10/2015 | Hisano |
| 2019/0126907 A1* | 5/2019 | Park ...................... B60W 20/16 |
| 2020/0130670 A1* | 4/2020 | Ogawa ................... B60W 20/13 |
| 2020/0398816 A1 | 12/2020 | Higuchi et al. |
| 2021/0078568 A1* | 3/2021 | Ogawa .................. B60W 10/08 |

FOREIGN PATENT DOCUMENTS

| | | |
|---|---|---|
| EP | 4230456 A1 | 8/2023 |
| JP | 2003-095042 A | 4/2003 |
| JP | 2009-280139 A | 12/2009 |
| JP | 2015-047972 A | 3/2015 |
| JP | 2015-120485 A | 7/2015 |
| JP | 2015-209153 A | 11/2015 |
| JP | 2016-188000 A | 11/2016 |
| JP | 2018-086970 A | 6/2018 |
| WO | 2019/116571 A1 | 6/2019 |

* cited by examiner

*Primary Examiner* — James M McPherson
(74) *Attorney, Agent, or Firm* — Sughrue Mion, PLLC

(57) ABSTRACT

A hybrid electric vehicle includes a control device that selectively executes a plurality of traveling modes. The control device can execute a process of acquiring a predicted traveling route, a process of specifying a required traveling energy required for traveling a specific section in an EV traveling mode, a process of setting a target value and at least one threshold value for the remaining battery charge amount, and a process of determining a traveling mode to be executed from among a plurality of traveling modes until the hybrid electric vehicle enters the specific section.

6 Claims, 3 Drawing Sheets

HYBRID ELECTRIC VEHICLE

CROSS-REFERENCE TO RELATED APPLICATION

This application claims priority to Japanese Patent Application No. 2022-081134 filed on May 17, 2022, incorporated herein by reference in its entirety.

BACKGROUND

1. Technical Field

The technology disclosed in the present specification relates to hybrid electric vehicles.

2. Description of Related Art

Japanese Unexamined Patent Application Publication No. 2003-095042 (JP 2003-095042 A) describes a power generation system mounted on a vehicle. The power generation system includes a generator driven by an engine, a battery that can be charged by the generator, and a control device. The control device controls charging of the battery by the generator based on the contents of a predicted traveling route of the vehicle (for example, city or suburb, travel time period).

SUMMARY

A hybrid electric vehicle that includes a motor and an engine for traveling is known. A hybrid electric vehicle can selectively execute a plurality of traveling modes such as an EV traveling mode and an HV traveling mode. The EV traveling mode here is a traveling mode in which the vehicle is driven by the motor while the engine is stopped, and the HV traveling mode is a mode in which the vehicle is driven by the engine and/or the motor while the engine is being operated. The HV traveling mode includes a normal HV traveling mode and a charging HV traveling mode in which the charge amount of the battery is greater than in the normal HV traveling mode.

In recent years, there has been a movement to limit the traveling of vehicles that involve engine operation in specific areas such as urban areas. When traveling in such a specific area, hybrid electric vehicles are strongly required to travel in the EV traveling mode. A cruising distance in the EV traveling mode depends on the remaining charge amount of the battery, and the battery cannot be charged while traveling in the specific area. Therefore, when the hybrid electric vehicle is scheduled to travel in the specific area, it is necessary to increase the remaining charge amount of the battery in advance before the hybrid electric vehicle travels to the specific area.

Regarding the above point, when the predicted traveling route of the hybrid electric vehicle is known in advance, it is possible to know in advance that the hybrid electric vehicle will travel in the specific area. Then, a specific section included in the specific section can be determined from the predicted traveling route, and a target value for the remaining charge amount of the battery can be set based on required traveling energy required to travel the specific section in the EV traveling mode. For example, when the remaining charge amount of the battery exceeds the target value, the EV traveling mode is executed because there is a sufficient margin in the remaining charge amount of the battery. On the other hand, when the remaining charge amount of the battery is below the target value, the charging HV traveling mode is executed to increase the remaining charge amount of the battery. In this way, by executing one of a plurality of traveling modes based on a magnitude relationship between the remaining charge amount of the battery and the target value, the remaining charge amount of the battery can be managed so as to equal to or more than the target value when the hybrid electric vehicle enters a specific section. However, for example, when the remaining charge amount of the battery is close to the target value, there is a possibility that the traveling mode is frequently switched between the EV traveling mode and the charging HV traveling mode. Such frequent traveling mode switching involves, for example, stopping and starting the engine, which may make the driver feel uncomfortable.

In view of the above circumstances, the present specification provides a technique for avoiding frequent switching of traveling modes in a hybrid electric vehicle.

The technology disclosed in this specification is embodied in a hybrid electric vehicle. In a first aspect, a hybrid electric vehicle includes: a motor for driving and an engine; a battery that supplies drive power to the motor and that is charged with power generated by the motor; and a control device that is configured to be able to control the motor and the engine, and that selectively executes a plurality of traveling modes. The traveling modes include at least an EV traveling mode in which the hybrid electric vehicle is driven by the motor while the engine is stopped, and an HV traveling mode in which the hybrid electric vehicle is driven by the engine and the motor or is driven by the engine or the motor while the engine is operated. The HV traveling mode includes a normal HV traveling mode, and a charging HV traveling mode in which a charge amount of the battery is greater than in the normal HV traveling mode. The control device can execute a process of acquiring a predicted traveling route, a process of specifying required traveling energy required for traveling a specific section in the EV traveling mode, the specific section being a section to be traveled in the EV traveling mode, when the predicted traveling route includes the specific section, a process of setting a target value for a remaining charge amount of the battery and at least one threshold value in which the target value is referenced, based on the specified required traveling energy, and a process of determining a traveling mode to be executed from the plurality of traveling modes, based on a magnitude relationship between an actual remaining charge amount of the battery and the target value, and the at least one threshold value, until the hybrid electric vehicle enters the specific section. The at least one threshold value includes a first threshold value obtained by adding a first margin to the target value. In the process of determining the traveling mode, the charging HV traveling mode is selected when the actual remaining charge amount of the battery falls below the target value, and the normal HV traveling mode is selected when the actual remaining charge amount of the battery exceeds the first threshold value while the charging HV traveling mode is being executed.

In the above configuration, until the hybrid electric vehicle enters the specific section, the traveling mode to be executed is determined from among the plurality of traveling modes, based on the magnitude relationship between the actual remaining charge amount of the battery and the target value, and the first threshold value (here, the value obtained by adding the first margin to the target value). Specifically, when the actual remaining charge amount of battery falls below the target value, the charging HV traveling mode is selected. Then, when the actual remaining charge amount of the battery exceeds the first threshold value while the charging HV traveling mode is being executed, the normal HV traveling mode is executed. According to such a configuration, it is possible to manage the remaining charge amount of the battery to be equal to or higher than the target value TE when the hybrid electric vehicle enters the specific section. In particular, in the normal HV traveling mode, changes in the remaining charge amount of the battery are relatively small compared to the charging HV traveling mode and the EV traveling mode. Therefore, by selecting the normal HV traveling mode after the required remaining charge amount of the battery is secured, the change occurring in the remaining charge amount of the battery is suppressed and frequent switching of the traveling mode can be avoided. As a result, it is also possible to suppress or avoid giving discomfort to the driver.

In a second aspect, in the first aspect, the at least one threshold value may further include a second threshold value obtained by adding a second margin to the first threshold value. In the process of determining the traveling mode, the EV traveling mode may be selected when the actual remaining charge amount of the battery exceeds the second threshold value while the normal HV traveling mode is being executed. According to such a configuration, in the section before the specific section, the hybrid electric vehicle can travel in the EV traveling mode when the remaining charge amount of the battery has a sufficient margin. Thereby, the energy efficiency of the hybrid electric vehicle can be improved.

In a third aspect, in the first or second aspect, in the process of determining the traveling mode, the charging HV traveling mode may be selected when the actual remaining charge amount of the battery falls below the target value while the normal HV traveling mode is being executed. According to such a configuration, the remaining charge amount of battery can be increased when the actual remaining charge amount of battery is lower than target value. Therefore, even when the actual remaining charge amount of the battery falls below the target value due to, for example, a change in the predicted traveling route PR, the charge amount corresponding to the required traveling energy can be ensured for the batter at the timing when the hybrid electric vehicle enters the specific section.

In a fourth aspect, a hybrid electric vehicle includes: a motor for driving and an engine; a battery that supplies drive power to the motor and that is charged with power generated by the motor; and a control device that is configured to be able to control the motor and the engine, and that selectively executes a plurality of traveling modes. The traveling modes include at least an EV traveling mode in which the hybrid electric vehicle is driven by the motor while the engine is stopped, and an HV traveling mode in which the hybrid electric vehicle is driven by the engine and the motor or is driven by the engine or the motor while the engine is operated. The HV traveling mode includes a normal HV traveling mode, and a charging HV traveling mode in which a charge amount of the battery is greater than in the normal HV traveling mode. The control device can execute a process of acquiring a predicted traveling route, a process of specifying required traveling energy required for traveling a specific section in the EV traveling mode, the specific section being a section to be traveled in the EV traveling mode, when the predicted traveling route includes the specific section, a process of setting a target value for a remaining charge amount of the battery and at least one threshold value in which the target value is referenced, based on the specified required traveling energy, and a process of determining a traveling mode to be executed from the plurality of traveling modes, based on a magnitude relationship between an actual remaining charge amount of the battery and the target value, and the at least one threshold value, until the hybrid electric vehicle enters the specific section. The at least one threshold value includes a second threshold value obtained by adding a first margin and a second margin to the target value. In the process of determining the traveling mode, while the normal HV traveling mode is being executed, the normal HV traveling mode is maintained until the actual remaining charge amount of the battery falls below the target value or until the actual remaining charge amount of the battery exceeds the second threshold value.

In the above configuration, until the hybrid electric vehicle enters the specific section, the traveling mode to be executed is determined from among the plurality of traveling modes, based on the magnitude relationship between the actual remaining charge amount of the battery and the target value, and the second threshold value (here, the value obtained by adding the first margin and the second margin to the target value). Specifically, during execution of the normal HV traveling mode, the charging HV traveling mode is maintained until the actual remaining charge amount of the battery falls below the target value or exceeds the second threshold value. Even with this configuration, after the normal HV traveling mode is selected, the normal HV traveling mode is maintained as long as the actual remaining charge amount of the battery does not deviate from the range from the target value to the second threshold value. The range from the target value to the second threshold value is relatively wide, and the remaining charge amount of the battery changes relatively little during execution of the normal HV traveling mode. Therefore, the normal HV traveling mode is maintained for a long time, and frequent switching from the normal HV traveling mode to another traveling mode can be avoided. As a result, it is also possible to suppress or avoid giving discomfort to the driver.

In a fifth aspect, in the fourth aspect, in the process of determining the traveling mode, the EV traveling mode may be selected when the actual remaining charge amount of the battery exceeds the second threshold value while the normal HV traveling mode is being executed. According to such a configuration, in the section before the specific section, the hybrid electric vehicle can travel in the EV traveling mode when the remaining charge amount of the battery has a sufficient margin. Thereby, the energy efficiency of the hybrid electric vehicle can be improved.

In a sixth aspect, in the fourth or fifth aspect, in the process of determining the traveling mode, the charging HV traveling mode may be selected when the actual remaining charge amount of the battery falls below the target value while the normal HV traveling mode is being executed. According to such a configuration, the remaining charge amount of battery can be increased when the actual remaining charge amount of battery is lower than target value. Therefore, even when the actual remaining charge amount of the battery falls below the target value due to, for example, a change in the predicted traveling route PR, the charge amount corresponding to the required traveling energy can be ensured for the batter at the timing when the hybrid electric vehicle enters the specific section.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
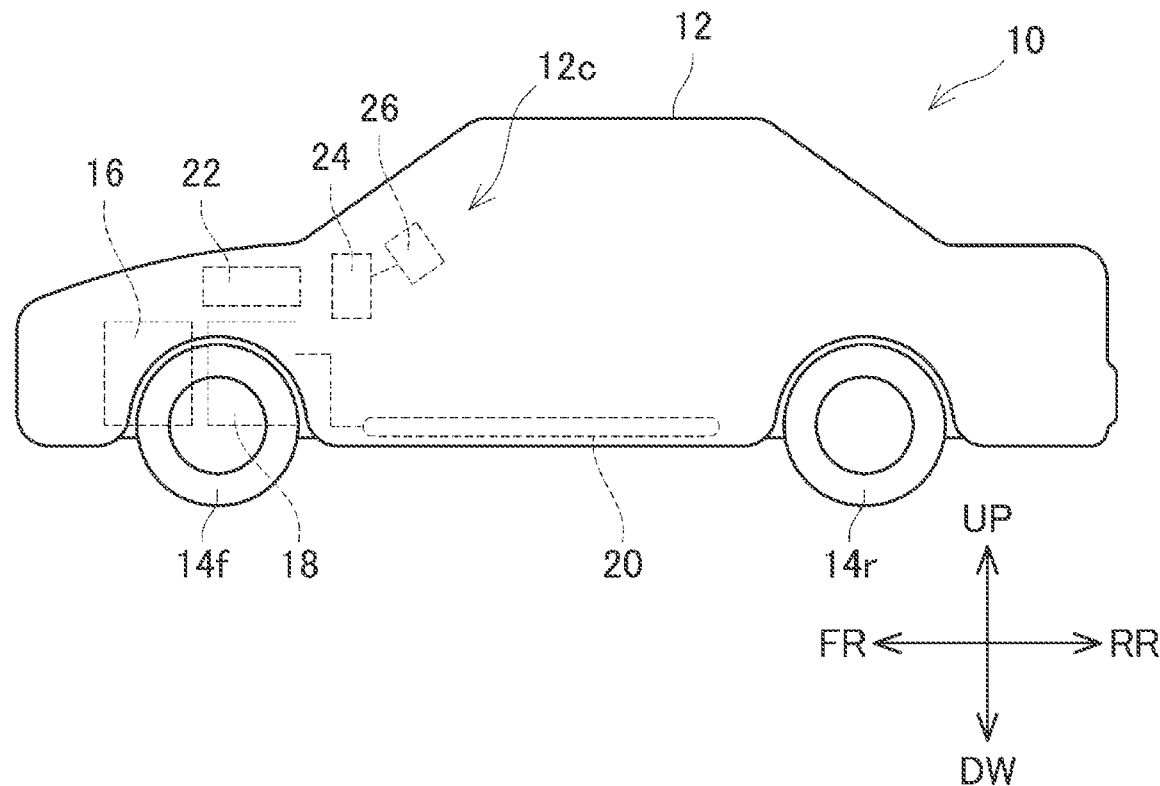
FIG. 1 is a diagram schematically showing the appearance of a vehicle 10.

A hybrid electric vehicle 10 (hereinafter referred to as the "vehicle 10") of this embodiment will be described with reference to the drawings. The vehicle 10 of this embodiment belongs to an electrified vehicle including a motor 18 that drives wheels 14f and 14r, and is typically an electrified vehicle (so-called automobile) that travels on a road surface. However, part or all of the technology described in this embodiment can be similarly applied to an electrified vehicle that runs on a track. Further, the vehicle 10 is not limited to being operated by a user, and may be remotely operated by an external device or may travel autonomously.

Here, a direction FR in the drawing indicates the front in a front-rear direction of the vehicle 10, and a direction RR indicates the rear in the front-rear direction of the vehicle 10. Further, a direction LH indicates the left side in a right-left direction of the vehicle 10, and a direction RH indicates the right side in the right-left direction of the vehicle 10. Further, a direction UP indicates the upper side of the vehicle 10 in the vertical direction, and a direction DW indicates the lower side of the vehicle 10 in the vertical direction. In the present specification, the front-rear direction of the vehicle 10, the right-left direction of the vehicle 10, and the up-down direction of the vehicle 10 may be simply referred to as the front-rear direction, the right-left direction, and the up-down direction, respectively.

As shown in FIG. 1, the vehicle 10 includes a body 12 and a plurality of wheels 14f, 14r. The body 12 has a vehicle cabin 12c, which is a space for occupants. The wheels 14f, 14r are rotatably attached to the body 12. The wheels 14f and 14r include a pair of front wheels 14f positioned at the front of the body 12 and a pair of rear wheels 14r positioned at the rear of the body 12. The pair of front wheels 14f is arranged coaxially with each other, and the pair of rear wheels 14r are also arranged coaxially with each other. Note that the number of the wheels 14f and 14r is not limited to four. Moreover, the body 12 is made of a metal such as steel or an aluminum alloy, although not particularly limited thereto.

Figure 2:
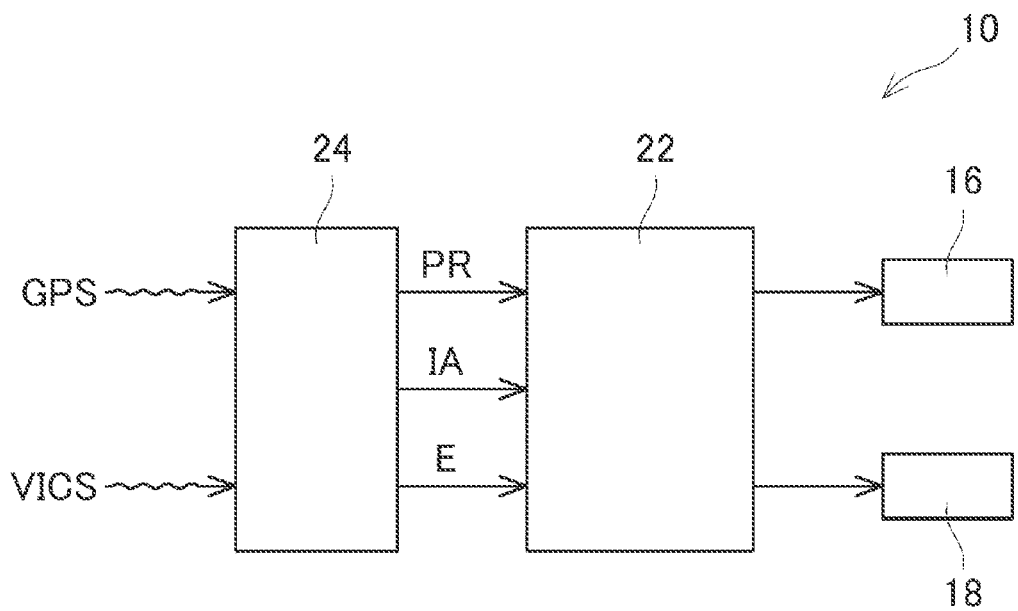
FIG. 2 is a block diagram showing a main configuration of the vehicle 10.

As shown in FIGS. 1 and 2, the vehicle 10 further includes an engine 16 and a motor 18. The engine 16 is a heat engine that burns fuel to generate power, such as a gasoline engine or a diesel engine. The engine 16 is connected to the pair of front wheels 14f and can drive the pair of front wheels 14f. The motor 18 is connected to the engine 16 via a power transmission path. The motor 18 is positioned between the engine 16 and the pair of front wheels 14f, and can function as a prime mover that drives the pair of front wheels 14f together with the engine 16. Also, the motor 18 can function not only as a prime mover but also as a generator. That is, the vehicle 10 can generate electricity by the motor 18 by driving the motor 18 with the engine 16. Alternatively, the vehicle 10 can perform regenerative braking of the pair of front wheels 14f by causing the motor 18 to function as a generator when the vehicle 10 needs to decelerate, for example, on a downhill. The power transmission path between the engine 16 and the pair of front wheels 14f may be provided with a speed reducer or a clutch as necessary. Moreover, the engine 16 and the motor 18 are not limited to the pair of front wheels 14f, and may be configured to drive at least one of the plurality of wheels 14f and 14r.

As shown in FIG. 1, the vehicle 10 further includes a battery 20. The battery has a plurality of built-in secondary battery cells, and is configured to be repeatedly rechargeable by external power. The battery 20 is connected to the motor 18 via a power conversion device (not shown), can supply driving power to the motor 18, and can be charged by power generated by the motor 18. Although not particularly limited, the battery 20 is a lithium ion battery, a nickel metal hydride battery, or the like.

As shown in FIGS. 1 and 2, the vehicle 10 further includes a hybrid (electronic control unit) ECU 22. The hybrid ECU 22 is a computer device having a processor, memory, and the like. The hybrid ECU 22 is communicably connected to the engine 16 and the motor 18 and is configured to be able to control their operations. For example, user operation information and vehicle information indicating a state of the vehicle 10 are input to the hybrid ECU 22. The operation information is, for example, accelerator operation amount information indicating an operation amount of an accelerator pedal by the user, and brake depression force information indicating a brake operation amount by the user. The vehicle information is, for example, vehicle speed information indicating a speed of the vehicle 10 and battery information indicating a remaining charge amount of the battery 20. The hybrid ECU 22 controls the operation of each part of the vehicle 10 described above in accordance with the input operation information and vehicle information.

The hybrid ECU 22 can selectively execute a plurality of traveling modes including an EV traveling mode and an HV traveling mode. The EV traveling mode is a traveling mode in which the vehicle is driven by the motor 18 while the engine 16 is stopped. On the other hand, the HV traveling mode is a traveling mode in which the vehicle travels with the engine 16 and/or the motor 18 while the engine 16 is being operated. The HV traveling mode includes a normal HV traveling mode and a charging HV traveling mode. In the charging HV traveling mode, the operations of the engine 16 and the motor 18 are controlled so that the charge amount in the battery 20 is greater than in the normal HV traveling mode. For example, in the charging HV traveling mode, the power output from the engine 16 is supplied to the pair of front wheels 14f so as to drive the vehicle 10, and the power output from the engine 16 is also supplied to the motor 18 so as to charge the battery with the power generated by the motor 18. As an example, the hybrid ECU 22 can display the traveling mode on the instrument panel provided in the vehicle cabin 12c. Thereby, the driver of the vehicle 10 can recognize the traveling mode being executed.

As shown in FIGS. 1 and 2, the vehicle 10 further includes a navigation system electronic control unit (ECU) 24 (hereinafter referred to as a "navigation ECU 24"). The navigation ECU 24 is a computer device having a processor, memory, and the like. The navigation ECU 24 is configured to communicate with an external system via the Internet or the like, and can acquire various information from the external system. For example, the navigation ECU 24 can acquire the current position of the vehicle 10 from a global positioning system (GPS). Furthermore, the navigation ECU 24 can specify the current position of the vehicle 10 on the map information by acquiring the map information from an external server or the like. The map information here includes information on a specific area IA in which the vehicle 10 is restricted from traveling with the operation of the engine 16, and geographical information (for example, speed limit, distance, road type, and gradient). Although not particularly limited, for the purpose of reducing the environmental load, the specific area IA may be set in a specific urbanized area, or may be temporarily set depending on the time of day, traffic conditions, etc. The navigation ECU 24 can also acquire traffic information, traffic regulation information, traffic accident information, etc. from a traffic information center such as a vehicle information and communication system (VICS) (registered trademark) center. The navigation ECU 24 can display such various information on the display 26 of the navigation system provided inside the vehicle cabin 12c.

In addition to the above, the navigation ECU 24 can accept a user operation via the display 26. For example, when the user inputs a destination on the display 26, the navigation ECU 24 creates a predicted traveling route PR from the current position of the vehicle 10 to the destination, and displays the predicted traveling route PR on the display 26. It should be noted that the navigation ECU 24 does not necessarily need to create the predicted traveling route PR based on the destination input by the user. As an example, the navigation ECU 24 may create a predicted traveling route PR on which the vehicle 10 is estimated to travel based on past travel data. Further, the navigation ECU 24 can calculate a required traveling power P required for traveling each point of the predicted traveling route PR, based on the past driving data and/or the road surface type, gradient, etc. included in the map information. Thus, the required traveling power P is a value estimated based on past running data and/or map information. In addition, the navigation ECU 24 can calculate a required traveling energy E required to travel each section, for each of a plurality of sections that make up the predicted traveling route PR, for example, by integrating the required traveling power P at each point on the predicted traveling route PR.

The navigation ECU 24 is communicably connected to the hybrid ECU 22 via a controller area network (CAN) communication. As a result, the hybrid ECU 22 can acquire various information from the navigation ECU 24, including the predicted traveling route PR, the specific area IA, and the required traveling energy E required to travel each section. The hybrid ECU 22 is configured to selectively execute a plurality of traveling modes based on various information acquired from the navigation ECU 24.

Figure 3:
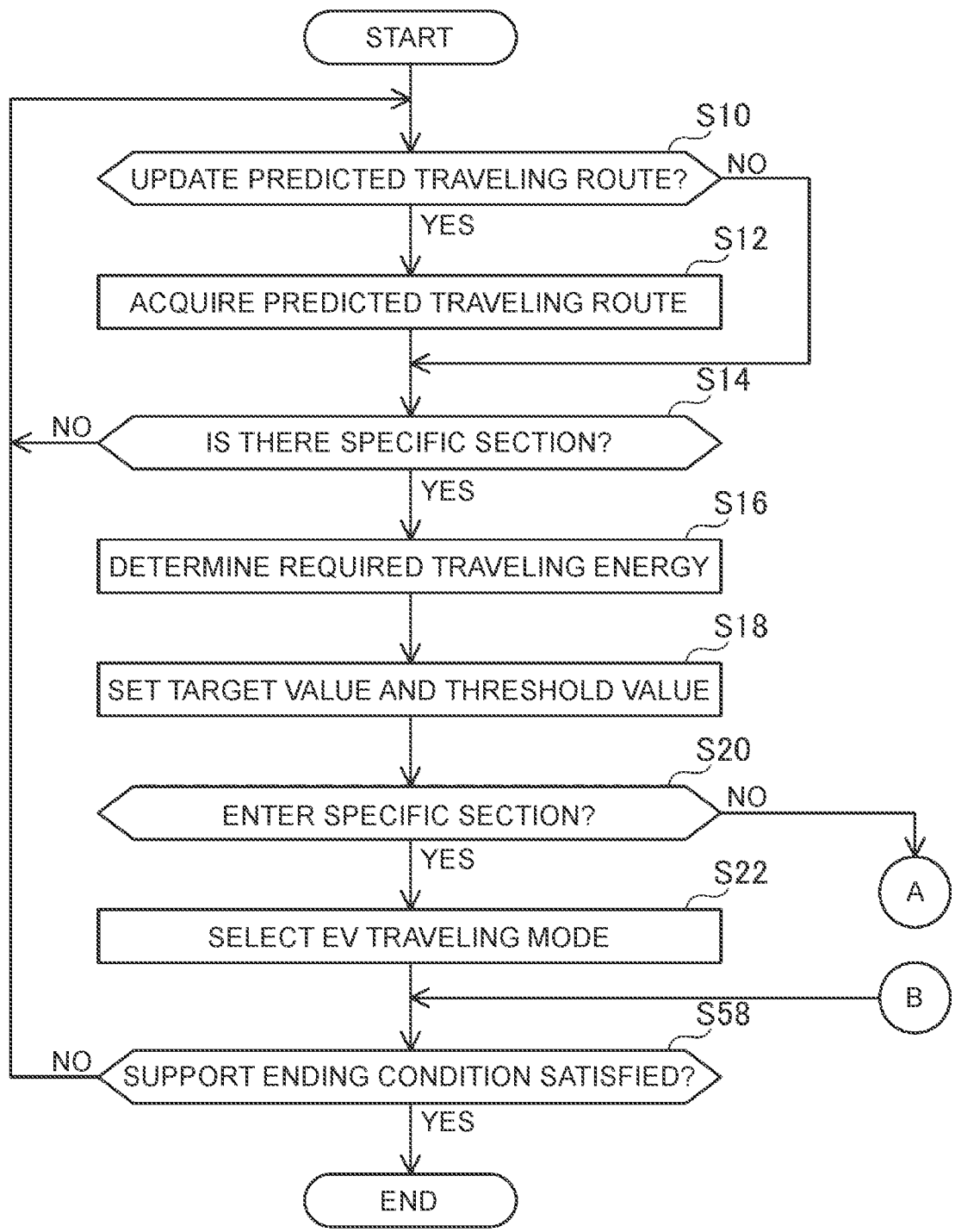
FIG. 3 is a flowchart showing an example of a series of control operations executed by a hybrid ECU 22, in which A in FIG. 3 continues to A in FIG. 4, and B in FIG. 3 continues from B in FIG. 4.
Figure 4:
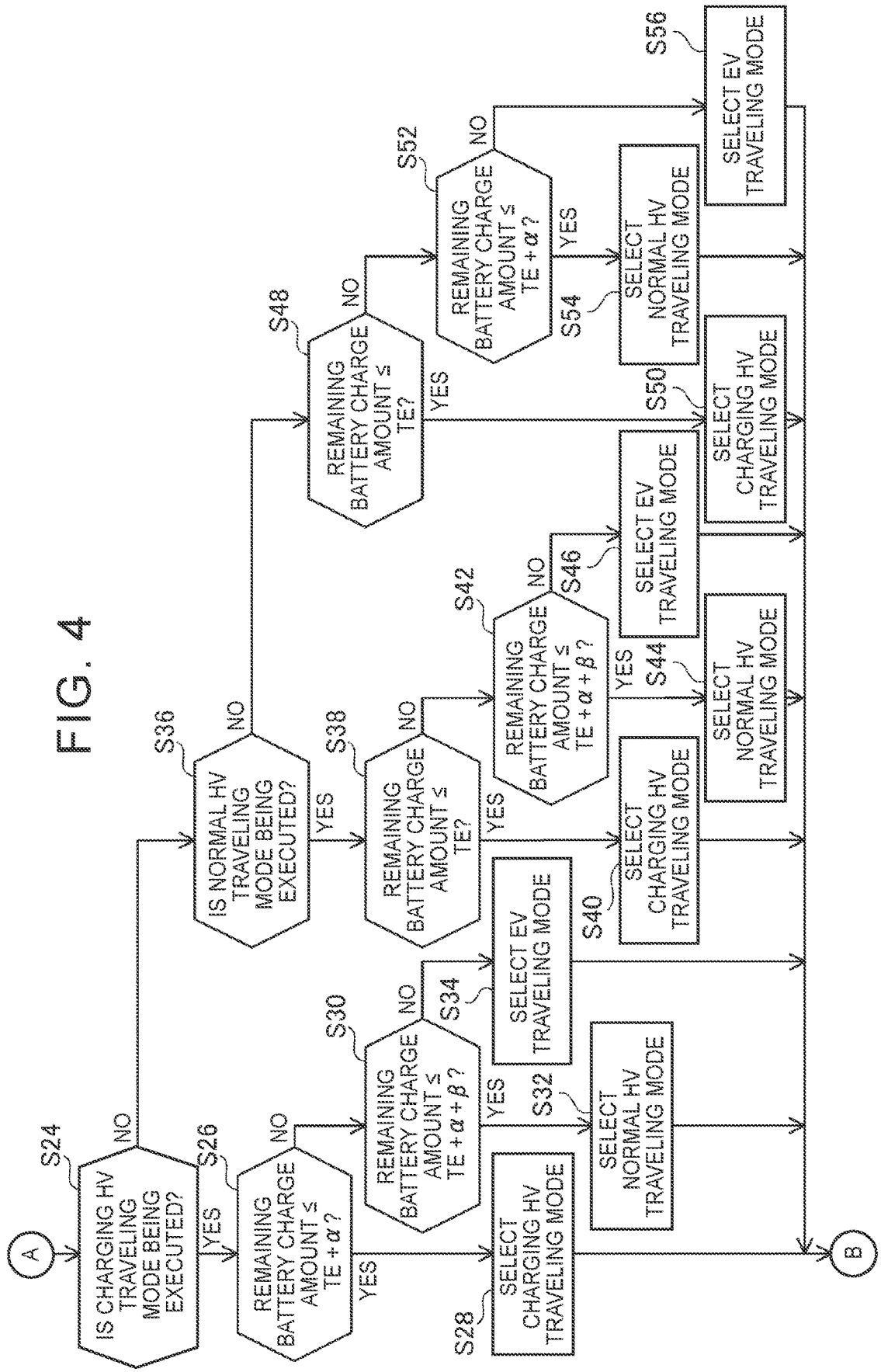
FIG. 4 is a flowchart showing an example of a series of control operations executed by a hybrid ECU 22, in which A in FIG. 4 continues from A in FIG. 3, and B in FIG. 4 continues to B in FIG. 3.

A specific example of the control operation executed by the hybrid ECU 22, which is the operation of the vehicle 10, will be described with reference to FIGS. 3 and 4. In this control operation, the hybrid ECU 22 assists the user in driving the vehicle 10 with high fuel efficiency by automatically switching the traveling mode with respect to the predicted traveling route PR created by the navigation ECU 24. As described above, the predicted traveling route PR is created by the navigation ECU 24 based on the destination specified by the user and past travel data. This predicted traveling route PR includes various information related to the predicted traveling route PR, such as information on the specific area IA, geographical information, traffic jam information, regulation information, and traffic accident information that the navigation ECU 24 acquired from an external server or traffic information center. Furthermore, the predicted traveling route PR also includes the required traveling energy E for each section forming the predicted traveling route PR. The hybrid ECU 22 is configured to execute the control operation shown in FIG. 3, for example, in response to an instruction or operation by a user.

First, in step S10, the hybrid ECU 22 determines whether the predicted traveling route PR has been updated. When the hybrid ECU 22 receives a predetermined notification from the navigation ECU 24 (YES in step S10), the hybrid ECU 22 acquires the updated predicted traveling route PR from the navigation ECU 24 (step S12). As a result, in addition to the predicted traveling route PR acquired by the hybrid ECU 22, various information included in the predicted traveling route PR is also updated. When the determination is NO in step S10, the hybrid ECU 22 omits step S12 and proceeds to the process of step S14.

In step S14, the hybrid ECU 22 determines whether the predicted traveling route PR includes a specific section in which the vehicle should travel in the EV traveling mode. The specific section here means a section included in the predetermined specific area IA. When it is determined YES in step S14, the hybrid ECU 22 proceeds to the process of step S16. When it is determined NO in step S14, the hybrid ECU 22 returns to the process of step S10.

In step S16, the hybrid ECU 22 specifies a required traveling energy ES required for traveling in the specific section in the EV traveling mode. As described above, the hybrid ECU 22 acquires from the navigation ECU 24, the required traveling energy E required for traveling in the EV traveling mode in each section forming the predicted traveling route PR. Then, the hybrid ECU 22 specifies the required traveling energy ES of the specific section by adding up the required traveling energy E for the section determined to be the specific section.

In step S18, the hybrid ECU 22 sets a target value TE for the remaining charge amount of the battery 20 based on the required traveling energy ES specified in step S16. Although not particularly limited, the target value TE for the remaining charge amount of the battery 20 is set as a value equal to the required traveling energy ES required to travel the specific section. In step S18, in addition to the target value TE, a first threshold value S1 and a second threshold value S2 based on the target value TE are also set. The first threshold value S1 is a value obtained by adding a first margin $\alpha$ to the target value TE, and the second threshold value S2 is a value obtained by adding the first margin $\alpha$ and the second margin $\beta$ to the target value TE. That is, the second threshold value S2 is a value obtained by adding the second margin $\beta$ to the first threshold value S1. Here, the first margin $\alpha$ is a value that is set in consideration of an error with respect to the specified required traveling energy ES. Therefore, at the timing when the vehicle 10 enters the specific section, when the first threshold value S1 (that is, the value obtained by adding the first margin $\alpha$ to the required traveling energy ES) is secured as the remaining charge amount of the battery 20, the vehicle can reliably travel through a whole specific section in the EV traveling mode. Note that the first margin $\alpha$ is not limited to a fixed value, and may be a value uniquely defined by a predetermined procedure or formula. Further, the second margin $\beta$ is a value that is set in consideration of an event (so-called hunting) in which switching of the traveling mode occurs unintentionally and frequently.

In step S20, the hybrid ECU 22 determines whether the vehicle 10 has entered a specific section. When it is determined YES in step S20, the hybrid ECU 22 selects the EV traveling mode (step S22). Thereby, the vehicle 10 travels in the EV traveling mode in the specific section. When it is determined NO in step S22, the hybrid ECU 22 proceeds to step S24 in FIG. 4 via A in FIG. 3.

In step S24, the hybrid ECU 22 determines whether the traveling mode being executed is the charging HV traveling mode. As described above, the hybrid ECU 22 can selectively execute a plurality of traveling modes including the EV traveling mode and the HV traveling mode (here, the normal HV traveling mode and the charging HV traveling mode). When the traveling mode being executed is the charging HV traveling mode (YES in step S24), the hybrid ECU 22 proceeds to the process of step S26. On the other hand, when the traveling mode being executed is the EV traveling mode or the normal HV traveling mode (NO in step S24), the hybrid ECU 22 proceeds to the process of step S36.

In step S26, the hybrid ECU 22 determines whether the actual remaining charge amount of the battery 20 is equal to or less than the first threshold value S1 (that is, the value obtained by adding the first margin α to the target value TE). As described above, the hybrid ECU 22 can monitor the actual remaining charge amount of the battery 20 since the vehicle information indicating the state of the vehicle 10 such as the remaining charge amount of the battery 20 is input to the hybrid ECU 22. When it is determined YES in step S26, the hybrid ECU 22 selects the charging HV traveling mode as the traveling mode to be executed (step S28). When it is determined NO in step S26, the hybrid ECU 22 returns to the process of step S30.

In step S30, the hybrid ECU 22 determines whether the actual remaining charge amount of the battery 20 is equal to or less than the second threshold value S2 (that is, the value obtained by adding the first margin α and the second margin β to the target value TE). When it is determined YES in step S30, the hybrid ECU 22 selects the normal HV traveling mode as the traveling mode to be executed (step S32). When it is determined NO in step S30, the hybrid ECU 22 selects the EV traveling mode as the traveling mode to be executed (step S34). Note that while the charging HV traveling mode is being executed (YES in step S24), the actual remaining charge amount of the battery 20 continuously increases. Thus, at the timing at which the actual remaining charge amount of the battery 20 exceeds the first threshold value S1 (NO in step S26 and YES in step S30), the normal HV traveling mode is selected (step S32).

In step S36, the hybrid ECU 22 determines whether the traveling mode that is being executed is the normal HV traveling mode. When the traveling mode that is being executed is the normal HV traveling mode (YES in step S36), the hybrid ECU 22 proceeds to the process of step S38. On the other hand, when the traveling mode that is being executed is the EV traveling mode (NO in step S36), the hybrid ECU 22 proceeds to the process of step S48.

In step S38, the hybrid ECU 22 determines whether the actual remaining charge amount of the battery 20 is equal to or less than the target value TE. When it is determined YES in step S38, the hybrid ECU 22 selects the charging HV traveling mode as the traveling mode to be executed (step S40). When it is determined NO in step S38, the hybrid ECU 22 returns to the process of step S42.

In step S42, the hybrid ECU 22 determines whether the actual remaining charge amount of the battery 20 is equal to or less than the second threshold value S2 (that is, the value obtained by adding the first margin α and the second margin β to the target value TE). When it is determined YES in step S42, the hybrid ECU 22 selects the normal HV traveling mode as the traveling mode to be executed (step S44). When it is determined NO in step S42, the hybrid ECU 22 selects the EV traveling mode as the traveling mode to be executed (step S46). Note that while the normal HV traveling mode is being executed (YES in step S36), since the actual remaining charge amount of the battery 20 continuously increases, at the timing at which the actual remaining charge amount of the battery 20 is below the target value TE (YES in step S38), the charging HV traveling mode is selected (step S40). On the other hand, during execution of the normal HV traveling mode (YES in step S36), at the timing at which the actual remaining charge amount of the battery 20 exceeds the second threshold value S2 (NO in step S38 and NO in step S42), the EV traveling mode is selected (step S46). Therefore, during execution of the normal HV traveling mode (YES in step S36), the HV traveling mode is maintained until the actual remaining charge amount of the battery 20 falls below the target value TE or the actual remaining charge amount of the battery 20 exceeds the second threshold value S2 (step S44).

In step S48, the hybrid ECU 22 determines whether the actual remaining charge amount of the battery 20 is equal to or less than the target value TE. When it is determined YES in step S50, the hybrid ECU 22 selects the charging HV traveling mode as the traveling mode to be executed (step S50). When it is determined NO in step S48, the hybrid ECU 22 returns to the process of step S52.

In step S52, the hybrid ECU 22 determines whether the actual remaining charge amount of the battery 20 is equal to or less than the first threshold value S1 (that is, the value obtained by adding the first margin α to the target value TE). When it is determined YES in step S52, the hybrid ECU 22 selects the normal HV traveling mode as the traveling mode to be executed (step S54). When it is determined NO in step S52, the hybrid ECU 22 selects the EV traveling mode as the traveling mode to be executed (step S56).

As described above, until the vehicle 10 enters the specific section, based on the magnitude relationship between the actual remaining charge amount of the battery 20 and the target value TE, the first threshold value S1 and the second threshold value S2, a traveling mode to be executed is determined from the plurality of traveling modes. At this time, regardless of the traveling mode being executed, the charging HV traveling mode is selected at the timing when the actual remaining charge amount of battery 20 falls below target value TE (steps S28, S40, S50).

Returning to FIG. 3, in step S58, the hybrid ECU 22 determines whether the support ending condition is satisfied. The support ending condition includes, for example, an instruction or operation by the user, or that the vehicle 10 has stopped. When it is determined NO in step S58, the hybrid ECU 22 returns to the process of step S10 and repeatedly executes the series of control operations shown in FIGS. 3 and 4. When it is determined YES in step S58, the hybrid ECU 22 terminates this series of control operations.

As described above, in the vehicle 10 of the present embodiment, until the vehicle 10 enters the specific section, based on the magnitude relationship between the actual remaining charge amount of the battery 20 and the target value TE, and the two threshold values S1 and S2, a traveling mode to be executed is determined from the plurality of traveling modes. Specifically, when the actual remaining charge amount of battery 20 falls below target value TE, the charging HV traveling mode is selected (steps S28, S40, S50). While the charging HV traveling mode is being executed (YES in step S24), when the actual remaining charge amount of the battery 20 exceeds the first threshold value S1 (NO in step S26 and YES in step S30), the normal HV traveling mode is executed (step S32).

According to such a configuration, it is possible to manage the remaining charge amount of the battery to be equal to or higher than the target value TE when the vehicle 10 enters the specific section. In particular, in the normal HV traveling mode, changes in the remaining charge amount of the battery 20 are relatively small compared to the charging HV traveling mode and the EV traveling mode. Therefore, by selecting the normal HV traveling mode after the required remaining charge amount of the battery 20 is secured, the change occurring in the remaining charge amount of the battery 20 is suppressed and frequent switching of the traveling mode can be avoided. As a result, it is also possible to suppress or avoid giving discomfort to the driver.

Further, in the vehicle 10 of the present embodiment, in the process of determining the traveling mode, when the normal HV traveling mode is being executed (YES in step S36) and the actual remaining charge amount of the battery 20 exceeds the second threshold value S2 (NO in step S38 and NO in step S42), the EV traveling mode is selected (step S46). According to such a configuration, in the section before the specific section, the vehicle 10 can travel in the EV traveling mode when the remaining charge amount of the battery 20 has a sufficient margin. Thereby, the energy efficiency of the vehicle 10 can be improved.

In the vehicle 10 of the present embodiment, in the process of determining the traveling mode, when the normal HV traveling mode is being executed (YES in step S36) and the actual remaining charge amount of the battery 20 is below the target value TE (YES at step S38), the charging HV traveling mode is selected (step S40). According to such a configuration, the remaining charge amount of battery 20 can be increased when the actual remaining charge amount of battery 20 is lower than target value TE. Therefore, even when the actual remaining charge amount of the battery 20 falls below the target value TE due to, for example, a change in the predicted traveling route PR, the charge amount corresponding to the required traveling energy ES can be ensured for the battery 20 at the timing when the vehicle 10 enters the specific section.

In the embodiments described above, at least one threshold value S1, S2 includes the first threshold value S1 and the second threshold value S2. However, in other embodiments, at least one threshold value S1, S2 may include at least one of the first threshold value S1 and the second threshold value S2. For example, when at least one threshold includes only the second threshold value S2, until the vehicle 10 enters the specific section, while the normal HV traveling mode is being executed (YES in step S36), the normal HV traveling mode is maintained until the actual remaining charge amount of the battery 20 falls below the target value TE or the actual remaining charge amount of the battery 20 exceeds the second threshold value S2 (step S44). Such a configuration also makes it possible to avoid frequent switching from the normal HV traveling mode to another traveling mode. As a result, it is also possible to suppress or avoid giving discomfort to the driver.

Further, in the other embodiment described above, in the process of determining the traveling mode, when the normal HV traveling mode is being executed (YES in step S36) and the actual remaining charge amount of the battery 20 exceeds the second threshold value S2 (NO in step S38 and NO in step S42), the EV traveling mode is selected (step S46). Even with this configuration, after the normal HV traveling mode is selected, the normal HV traveling mode is maintained as long as the actual remaining charge amount of the battery 20 does not deviate from the range from the target value TE to the second threshold value S2. The range from the target value TE to the second threshold value S2 is relatively wide, and the remaining charge amount of the battery 20 changes relatively little during execution of the normal HV traveling mode. Therefore, the normal HV traveling mode is maintained for a long time, and frequent switching from the normal HV traveling mode to another traveling mode can be avoided.

In the other embodiment described above, in the process of determining the traveling mode, when the normal HV traveling mode is being executed (YES in step S36) and the actual remaining charge amount of the battery 20 is below the target value TE (YES at step S38), the charging HV traveling mode is selected (step S40). According to such a configuration, the remaining charge amount of battery 20 can be increased when the actual remaining charge amount of battery 20 is lower than target value TE. Therefore, even when the actual remaining charge amount of the battery 20 falls below the target value TE due to, for example, a change in the predicted traveling route PR, the charge amount corresponding to the required traveling energy ES can be ensured for the battery 20 at the timing when the vehicle 10 enters the specific section.

Although a number of specific examples have been described in detail above, these are merely examples and do not limit the scope of claims. The techniques described in the claims include various modifications and alternations of the specific examples illustrated above. The technical elements described in this specification or drawings exhibit technical utility either on its own or in combination.

What is claimed is:
1. A hybrid electric vehicle comprising:
 a motor for driving and an engine;
 a battery that supplies drive power to the motor and that is charged with power generated by the motor; and
 a control device that is configured to be able to control the motor and the engine, and that selectively executes a plurality of traveling modes,
 wherein the traveling modes include at least an EV traveling mode in which the hybrid electric vehicle is driven by the motor while the engine is stopped, and an HV traveling mode in which the hybrid electric vehicle is driven by the engine and the motor or is driven by the engine or the motor while the engine is operated,
 wherein the HV traveling mode includes a normal HV traveling mode, and a charging HV traveling mode in which a charge amount of the battery is greater than in the normal HV traveling mode,
 wherein the control device is able to execute
  a process of acquiring a predicted traveling route,
  a process of specifying required traveling energy required for traveling a specific section in the EV traveling mode, the specific section being a section to be traveled in the EV traveling mode, when the predicted traveling route includes the specific section,
  a process of setting a target value for a remaining charge amount of the battery and at least one threshold value in which the target value is referenced, based on the specified required traveling energy, and
  a process of determining a traveling mode to be executed from the plurality of traveling modes, based on a magnitude relationship between an actual remaining charge amount of the battery and the target value, and the at least one threshold value, until the hybrid electric vehicle enters the specific section, wherein the at least one threshold value includes a first threshold value obtained by adding a first margin to the target value, and wherein in the process of determining the traveling mode, the charging HV traveling mode is selected when the actual remaining charge amount of the battery falls below the target value, and the normal HV traveling mode is selected when the actual remaining charge amount of the battery exceeds the first threshold value while the charging HV traveling mode is being executed.

2. The hybrid electric vehicle according to claim 1, wherein the at least one threshold value further includes a second threshold value obtained by adding a second margin to the first threshold value, and wherein in the process of determining the traveling mode, the EV traveling mode is selected when the actual remaining charge amount of the battery exceeds the second threshold value while the normal HV traveling mode is being executed.

3. The hybrid electric vehicle according to claim 1, wherein in the process of determining the traveling mode, the charging HV traveling mode is selected when the actual remaining charge amount of the battery falls below the target value while the normal HV traveling mode is being executed.

4. A hybrid electric vehicle comprising:

a motor for driving and an engine;

a battery that supplies drive power to the motor and that is charged with power generated by the motor; and a control device that is configured to be able to control the motor and the engine, and that selectively executes a plurality of traveling modes, wherein the traveling modes include at least an EV traveling mode in which the hybrid electric vehicle is driven by the motor while the engine is stopped, and an HV traveling mode in which the hybrid electric vehicle is driven by the engine and the motor or is driven by the engine or the motor while the engine is operated, wherein the HV traveling mode includes a normal traveling mode, and a charging HV traveling mode in which a charge amount of the battery is greater than in the normal HV traveling mode, wherein the control device is able to execute a process of acquiring a predicted traveling route, a process of specifying required traveling energy required for traveling a specific section in the EV traveling mode, the specific section being a section to be traveled in the EV traveling mode, when the predicted traveling route includes the specific section, a process of setting a target value for a remaining charge amount of the battery and at least one threshold value in which the target value is referenced, based on the specified required traveling energy, and a process of determining a traveling mode to be executed from the plurality of traveling modes, based on a magnitude relationship between an actual remaining charge amount of the battery and the target value, and the at least one threshold value, until the hybrid electric vehicle enters the specific section, wherein the at least one threshold value includes a second threshold value obtained by adding a first margin and a second margin to the target value, and wherein in the process of determining the traveling mode, while the normal HV traveling mode is being executed, the normal HV traveling mode is maintained until the actual remaining charge amount of the battery falls below the target value or until the actual remaining charge amount of the battery exceeds the second threshold value.

5. The hybrid electric vehicle according to claim 4, wherein in the process of determining the traveling mode, the EV traveling mode is selected when the actual remaining charge amount of the battery exceeds the second threshold value while the normal HV traveling mode is being executed.

6. The hybrid electric vehicle according to claim 4, wherein in the process of determining the traveling mode, the charging HV traveling mode is selected when the actual remaining charge amount of the battery falls below the target value while the normal HV traveling mode is being executed.

* * * * *